Jan. 10, 1967  H. LEVIN ETAL  3,296,924
SINGLE CELL IMAGE PLANE POSITION APPRAISAL
SYSTEM FOR A SLIDE PROJECTOR
Filed Feb. 23, 1965

Inventors
Herman Levin
Eric K. Maxon
By Barry L. Clark
John E. Peele Jr.  Atty.

a corporation of Illinois
Filed Feb. 23, 1965, Ser. No. 434,252
9 Claims. (Cl. 88—26)

3,296,924
SINGLE CELL IMAGE PLANE POSITION APPRAISAL SYSTEM FOR A SLIDE PROJECTOR

Herman Levin, Glenview, and Eric K. Maxon, Evanston, Ill., assignors to Bell & Howell Company, Chicago, Ill., a corporation of Illinois
Filed Feb. 23, 1965, Ser. No. 434,252
9 Claims. (Cl. 88—26)

The present invention relates to an image plane position appraisal system for use with a projector, and particularly to such a system mounted for movement with the projection lens of a slide propector relative to the image support material of a slide to maintain the best focus of the resulting projected image.

Several patents have suggested systems for maintaining the best focus of images projected upon remote surfaces. These generally have approximately the position of the image plane by appraising the position of the slide mount. Because the image bearing material of the slide, and therefore the image plane, is capable of movement relative to the mount, such systems often fail to provide the desired consistant performance. Most of these systems when incorporated into projectors have required the user to mount the slide either in special mounts or to maintain uniformity in the mount selected. In either case, the user is necessarily put to additional expense and trouble in changing each of his presently owned slides into the special and/or uniform mounts to obtain the desired results with the focus maintaining system of the particular projector. Because of these requirements, only that particular type of mount may be used with that particular type of projector thus requiring the user to rely upon manuel focusing for the other mounts, such as the glass type.

Best focus of the projected image occurs when the image plane of the slide and the focal plane of the projection lens are coincident. Although a typical projection lens has a depth of focus of approximately $\frac{1}{16}$ of an inch at the focal plane, the central portion of the image area of a slide may move a total of $\frac{3}{16}$ of an inch from one side of the initial image plane to the other side thereof. This movement, which is generally unpredictable, often causes the image plane of the slide to change position during projection. Correction of focus manually is generally distracting to the viewers.

Thus, it is desired to provide a simple and economical system for automatically and continuously appraising the position of the image plane and causing the focal plane of the lens to be maintained coincident therewith for the entire period during which the slide is projected. By utilizing a pre-aligned appraisal beam source and a means for receiving the beam as reflected from the image support material, such a system will provide the desired results. Because the present appraisal system incorporates but a single light sensitive cell, the associated circuitry is less complex than systems incorporating two or more such cells. The present system has the further advantage of utilizing a relatively inexpensive D.C. motor which may be operable in only a single direction. The problem of overshoot and hunting, sometimes attendant with the use of an electronic appraisal system is considerably reduced through the use of solid state components causing the rate of rotation of the motor to be reduced as the image plane and focal plane approach coincidence.

To better understand this invention, reference should be made to the accompanying drawings wherein.

Figure 1:
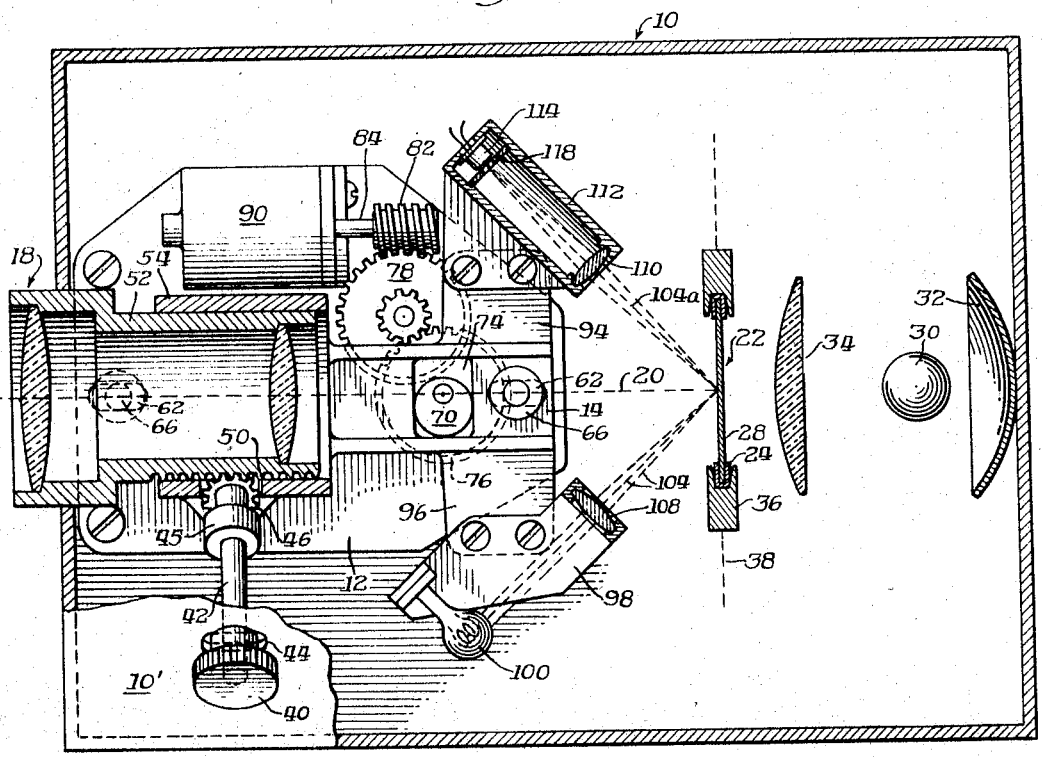
FIG. 1 is a schematic view of a projector on which the present appraisal system is mounted.

Disclosed in FIG. 1 is the housing 10 of a projector to which is fixedly attached a base portion 12. A carriage 14 is supported on the base 12 for relatively frictionless movement. On the carriage 14 is mounted a projection lens 18 defining a projection axis 20 along which an image from a slide 22 is projected. Slide 22, comprised of a mount 24 and an image support material or film 28 which is held along its peripheral edges by the mount, is supported in a slide carrier 36 of the projector. The area of the image support material 28 within the periphery of the mount and particularly the central portion thereof forms the hereinafter referred to "image plane".

Illumination of the image area is provided by projection lamp 30. Light from the lamp is concentrated by reflector 32 to pass through at least one condensing lens, such as 34, heat-absorbing glasses (not shown), the slide 22, and the projection lens 18 to project the image of the slide upon a remote surface. The image support material 28 is deformable and is capable of "popping" or bowing either toward or away from condenser 34 when heated by the air passing thereover, which air has been heated by the lamp 30. The slide carrier 36 is desirably located so that the focal plane 38 of production len 18 can be made coincident with a slide in the carrier. This focal plane is inherently located a predetermined distance behind the projection lens when an image from a slide is most sharply focused upon a remote surface. Thus, it is seen that the focal plane and the image plane are coincident when this projected image is at best focus.

Projection lens 18 is mounted on the carriage 14 in a manner such that it may be moved parallel to the projection axis 20 with respect to the carriage, as well as be moved by the carriage when the carriage moves. The movement relative to the carirage is accomplished by operation of a focusing member 40 which is attached to the end of a shaft 42. The shaft extends through a slot 44 in projector housing portion 10'. The slot is elongated to permit movement of the shaft 42 therein for the full range of movement of carriage 14. The inner end of the shaft 42 extends through a bearing 45 attached to the carriage 14. A small gear 46 is fixed to the inner end of the shaft 42 to mate with a rack 50 formed long the barrel 52 of lens 18. The barrel 52 is frictionally, although movably, retained in a caging 54 of carriage 14. The movement of the carriage relative to the base 12 may be maintained parallel with the projection axis through any of several known means. In this preferred embodiment, the alignment and the extent of longitudinal movement of the carriage is determined by the cooperation between a pair of elongated slots 62, 62 and a pair of headed studs 66, 66 which extend into the slots. The length of these slots is slightly greater than the anticipated extent though which the carriage 14 is to move to compensate for the "pop" of the image support material 28.

Focusing member 40 is operated in a known manner to cause movement of the projection lens 18 relative to the carriage 14 to obtain an initial best focus condition of the projected image. This movement of lens 18 establishes the predetermined relationship between the lens and the focal plane 38 such that the focal plane is made coincident with the image plane of slide 22.

Powered movement of the carriage 14 in a path essentially parallel to the projection axis to maintain the focus of the lens 18, supported thereon, is accomplished by the rotation of an eccentric 70 which extends into an elongated recess 74, preferably formed in the bottom of the carriage. The eccentric is preferably integral with a gear 76 which is driven by an intermediate speed reducing gear or gears, such as the two-diameter gear 78. This latter gear is powered by a drive gear 82 which is formed on the drive shaft 84 of a uni-directionally operable D.C. motor 90. Motor 90 is fixed to the base 12. Energization of the motor is controlled by circuitry as will be hereinafter described. The drive of the motor 90 is transmitted to the carriage 14 as the eccentric 70 is caused to rotate about the axis of rotation of gear 76. The eccentric engages the forward and rearward wall portions of recess 74 to cause the carriage to be rectilinearly reciprocated in a cyclical manner as guided by the slots 62, 62 and studs 66, 66. The eccentricity of the eccentric 70 is sufficient to move the carriage in excess of the range through which the image support material 28 will "pop."

Extending from the carriage 14 are a pair of arms 94, 96 supporting components of an image plane position appraisal system. Each of these arms extends at an angle relative to the projection axis 20. Supported by plate 98, which may be mounted for adjustment on arm 96, is a sensing or appraisal lamp 100 producing a beam of light rays 104. These rays are preferably relatively rich in infrared radiation. A condensing lens 108 is mounted on the plate 98 in the path of the light rays 104 to cause them to focus at a point approximately at the center of the slide image area 28. These rays are then reflected as rays 104a, through a second condensing lens 110 mounted in one end of a generally tubular enclosure 112, which enclosure is attached to arm 94. The condensing lens 110 causes the reflected light rays 104a to again come to a point of focus upon the surface of a light sensitive cell 114 located at the opposite end of enclosure 112. Although either the phototransistor, photoconductor or photovoltaic type cells may be used in a circuit designed for the particular cell, the instant embodiment incorporates the photo-transistor type in which a current flows when light impinges thereon. The effective surface of phototransistor 114 is only slightly greater in diameter than the anticipated diameter of focused beam 104a. Located within the tube 112 just ahead of the cell surface is a ring-like baffle 118, which serves to limit the angle from which light rays can impinge upon the cell. Effectiveness of the cell is enhanced because the preferred silicon type phototransistor is highly sensitive in the infrared range of the spectrum, yet relatively non-sensitive in the visible range. The combination of these features and the further mounting of the cell behind the baffle 118 within the tubular enclosure 112 reduces to a minimum the effect upon the photocell of extraneous light such as that which may impinge thereon from projection lamp 30, as dispersed by the image support material 28. The light from the projection lamp is relatively weak in infrared radiation due to the normal presence of heat filters along the projection axis between the slide 22 and the lamp 30. It is noted that the elements of the appraisal system are mounted on the carriage 14 for movement therewith.

Figure 3:
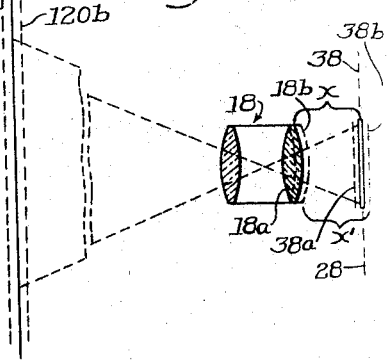
FIG. 3 is a diagrammatic view of the principles upon which the system is made operable.

The elements disclosed in solid lines in FIG. 3 express the relationships between the image plane 28, the focal plane 38, the lens 18 and a remote surface 120, such as a screen. When the lens 18 is focused to cause focal plane 38 to become coincident with image plane 28, the projected image falls upon the remote surface 120. When the support material "pops," it causes the effective image plane to be moved to one of the dotted line positions 38a or 38b. The plane of best focus of the projected image is then 120a or 120b if lens 18 is maintained in its solid line position. Movement of the image plane alters the distance between the image plane and the lens to become either greater or less than the predetermined distance $x$ between the lens and the focal plane. Because the latter distance $x$ is unchanged, the lens must necessarily be moved either to position 18a, or 18b to move the focal plane 38 into coincidence with the image plane 28 causing the projected image to again be at best focus on remote surface 120. Thus, it is seen that the distance $x'$, for example, with a lens moved to 18b and the image and focal planes in plane 38b, will be essentially identical with the distance $x$.

Figure 2:
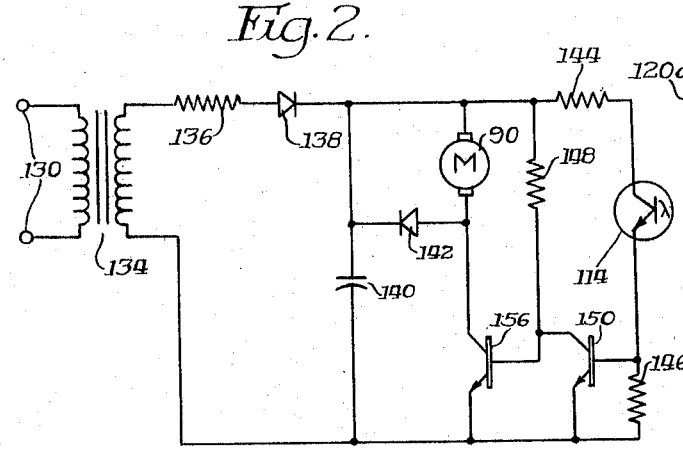
FIG. 2 is a circuit diagram of the appraisal system controlled circuit.

A control circuit, as seen in FIG. 2, selectively connects the D.C. motor 90 to power from a source 130. The incoming voltage reaching the motor is reduced by a transformer 134. This is subsequently rectified and filtered by diode 138, resistance 136 and capacitor 140. The rectified voltage causes the motor to be driven in one direction as current passes through the motor when a drive transistor 156 is turned "on," completing the circuit.

A diode 142 and resistors 144, 146 are located in the circuit to protect the various solid state components.

The light sensitive cell 114, of the phototransistor type, conducts current when impinged upon by light rays. The inverter transistor 150 is turned "on" as the phototransistor provides a current path from rectifier diode 138 to its base. The inverter transistor being "on" diverts the current normally passing to the base of switching transistor 156 through the line including reistor 148, turning the transistor 156 "off." Because the current path to motor 90 is thus interrupted, the motor 90 is inoperative as long as light is impinging upon photocell 114.

When no light is impinging upon photocell 114, or a quantity less than the critical quantity necessary to turn the photocell "on," no current is caused to pass through inverter transistor 150 as it is in its "off" state. Thus, current flows to the base of the switching transistor by way of reistor 148,, turning it "on," thereby completing the circuit and energizing the motor. Because the motor 90 is energized, the carriage 14 and elements mounted thereon is driven in a cyclical manner by the eccentric 70 causing the reflected beam 104a to move until it impinges upon the photocell 114. Operation of the motor 90 terminates when a sufficient quantity of light from appraisal lamp 100 impinges upon the photocell to activate the inverter transistor 150.

Although it is believed the function of the instant single cell image plane position appraisal system has been explained, the following will discuss the operation generally. The appraisal system is supported on movable carriage 14 with the components angularly related to provide a desired orientation wherein the light beam 104 from the sensing lamp 100 is reflected by the image area 28 of the slide 22 so as to normally impinge upon photocell 114 when best focus has been initially obtained by adjustment of the lens 18 with focusing member 40. The system then interprets the relative positions of the image plane of slide 22 and the focal plane of lens 18 as coincident. The photocell 114 receives the maximum quantity of light rays from the lamp 100 to cause the control circuitry to prevent energization of motor 90 when the planes are coincident. This is the condition which the system continuously seeks.

When the slide "pops," for example, inwardly of the projector such as to a plane 38b as seen in FIG. 3, the reflected rays 104a are moved by the change in position of the image plane to impinge upon other than phototransistor cell 114. The absence of current flow through phototransistor turns "off" the inverter transistor 150 and the consequent turning "on" of switching transistor 156 causing the current from source 130 to energize the motor 90 to rotate. The operation of the motor thus rotates eccentric 70 to rectilinearly reciprocate the carriage 14. For the "popping" of any slide within the anticipated range for which this system has been designed, the reciprocation of the carriage is less than one cycle since at some point within this cycle, the reflected ray 104a again impinges upon photocell 114. Because the motor 90 is unidirectionally operable, essentially a complete carriage movement cycle occurs if the image plane moves slightly behind the focal plane, assuming the drive to be moving the carriage forwardly from its last position. However, if the image plane had moved forwardly of the initial plane, only a small movement of the carriage would cause the focal plane to become coincident with the image plane.

Depending upon the photocell type used, it may be desirable to enhance the sensitivity of the appraisal system by locating an infrared type filter in the path of the reflected light rays through the tubular enclosure. Such a filter is intended to pass only infrared radiation while blocking the visible radiation, therefore further reducing the chance of any extraneous light affecting the operation of the system.

Although a specific embodiment of the invention has been shown and described, it is to be understood that modifications and variations may be effected without departing from the scope of the novel concepts of the invention.

We claim:

1. A focus determination apparatus for a projector for slides including a projection lens having a focal plane located a predetermined distance therebehind, each of said slides including a film held along its edges in a mount, the interior peripheral edges of the mount defining the image area to be projected along a projection axis of the projection lens, the image area establishing an image plane capable of shifting out of coincidence with the focal plane of the projection lens upon "popping" of said film during projection, the invention comprising:
   support means adapted to be moved with respect to the image plane;
   means for adjustably mounting said projection lens on said support means for movement therewith;
   a unidirectionally operable motor;
   means operably connecting said motor and said support means for causing said support means to be cyclically moved and causing said focal plane of said lens to be cyclically moved with respect to said image plane;
   a source of light rays mounted on said support means so as to direct said light rays toward said film at an angle relative thereto;
   a single photocell mounted on said support means at an angle relative to said image plane such that light rays from said source are reflected to impinge upon said photocell when said image plane and said focal plane are coincident and to impinge upon other than said photocell when said image plane and said focal plane are out of coincidence;
   a power source for energizing said motor;
   circuit means selectively connectable between said motor, said source and said photocell wherein said motor is energized by said source when said light rays impinge upon other than said photocell and is deenergized when said light rays impinge upon said photocell when said image plane is coincident with said focal plane.

2. A focus determination apparatus as in claim 1 wherein said photocell is a phototransistor operably connected to permit power flow in said circuit means; and said circuit means includes at least one transistor adapted to permit power flow through said motor when other than said phototransistor is impinged upon by said light rays, wherein said motor is energized.

3. An appraisal system as in claim 1 wherein said support means is a carriage; and said means for cyclically moving said support means is an eccentric means wherein said carriage is caused to be rectilinearly reciprocated when said motor means is energized.

4. An appraisal system as in claim 1 wherein said projection lens is initially manually adjusted relative to said support means to locate said focal plane in coincidence with said image plane; and said projection lens is thereafter movable by said support means to maintain said focal plane in coincidence with said image plane when said image plane moves.

5. An appraisal system as in claim 1 wherein said photocell is a phototransistor;
   said phototransistor being operably connected in said circuit means with said power source and a control circuit portion to permit current flow through said motor when said light rays impinge upon other than said phototransistor and to prevent current flow through said motor when said light rays impinge upon said phototransistor;
   said control circuit portion including an inverter transistor and a switching transistor;
   said control circuit portion being operably connected with said phototransistor wherein when said light rays impinge upon said phototransistor, said inverter transistor diverts current from said switching transistor causing said switching transistor to prevent current flow to said motor wherein said motor is inoperative, and wherein when said light rays impinge upon other than said phototransistor, said inverter transistor permits current flow to said switching transistor causing said switching transistor to permit current flow from said source through said motor wherein said motor is energized.

6. An appraisal system as in claim 1 wherein said photocell is a phototransistor;
   said circuit means includes a control circuit portion comprising an inverter transistor and a switching transistor;
   said control circuit portion being operably connected with said phototransistor wherein when said light rays impinge upon said phototransistor, said inverter transistor is turned "on" causing said switching transistor to be turned "off" whereby said motor is caused to be inoperative.

7. A focus determination apparatus for a projector for slides including a projection lens with a focal plane located a predetermined distance therebehind, each of said slides including an image support material held along its edges in a mount, the interior peripheral edges of the mount defining the image area to be projected along a projection axis of the projection lens, the image area establishing an image plane capable of shifting out of coincidence with the focal plane of the projection lens upon "popping" of said image support material during projection, the invention comprising:
   a carriage adjustably mounting said projection lens for movement substantially parallel with said projection axis of said projection lens so that said focal plane of said projection lens is moved relative to said image plane and said planes may be made coincident;
   unidirectionally rotatable motor means;
   eccentric means operably connecting said motor means and said carriage so that said carriage is rectilinearly reciprocated in a cyclical manner;
   an appraisal system mounted on said carriage for movement therewith;
   said appraisal system including a source of light rays and a single photocell positioned on opposite sides of said projection axis such that said light rays from said source are directed toward said image plane and are reflected from said image plane to impinge upon said photocell when said image plane and said focal plane are coincident and to impinge upon other than said photocell when said image plane shifts out of coincidence with said focal plane; and
   circuit means operably connected between said photocell and said motor means whereby said motor means is selectively energized to drive said carriage and move said focal plane and said appraisal system relative to said image plane.

8. A focus determination apparatus for a projector for slides including a projection lens with a focal plane located a predetermined distance therebehind, each of said slides including an image support material held along its edges in a mount, the interior peripheral edges of the mount defining the image area to be projected along a projection axis of the projection lens, the image area establishing an image plane capable of shifting out of coincidence with the focal plane of the projection lens upon "popping" of said image support material during projection, the invention comprising:

a carriage supporting said projection lens for relative movement with respect to said image plane so that said focal plane may be made coincident therewith;

a unidirectionally rotatable motor;

means operably connecting said motor and said carriage to cause said carriage to be rectilinearly reciprocated substantially parallel with said projection axis;

an image plane position appraisal system mounted on said carriage for movement therewith:

said appraisal system including a source of light rays and a photocell positioned on opposite sides of said projection axis wherein light rays from said source are reflected from said image plane to impinge upon said photocell when said image plane and said focal plane are coincident and to impinge upon other than said photocell when said planes are out of coincidence; and circuit means including a control component operably connected between said photocell and said motor whereby said motor is energized when said image plane moves causing said light rays to impinge upon other than said photocell and is deenergized when said image plane and focal plane are coincident and said light rays impinge upon said photocell.

9. A focus determination apparatus for a projector for slides including a projection lens with a focal plane located a predetermined distance therebehind, each of said slides including a film held along its edges in a mount defining an image area to be projected along a projection axis of the projection lens, the image area establishing an image plane capable of shifting out of coincidence with the focal plane of the projection lens upon "popping" of said film during projection, the invention comprising:

a base;

carriage means mounted on said base for movement relative thereto;

means for adjustably mounting said projection lens on said carriage for movement therewith;

unidirectionally rotatable motor means operably connected to cyclically move said carriage means relative to said base;

an appraisal system mounted on said support means for movement therewith;

said appraisal system including a source of light rays and a single photocell positioned in angular relationship with said film image plane so that light rays from said source are directed toward said image plane and are reflected from said image plane to impinge upon said photocell when said image plane and said focal plane are coincident and to impinge upon other than said photocell when said image plane is displaced from said focal plane; and circuit means including a control circuit portion operably connected between said photocell and said motor means;

said control circuit portion comprising an inverter transistor and a switching transistor being operably connected with said photocell wherein when said light rays impinge upon other than said photocell due to movement of said image plane, said inverter transistor is turned "off" causing said switching transistor to be turned "on" and said motor energized whereby said carriage is caused to be driven by said motor causing said focal plane to move until said light rays again impinge upon said photocell causing said circuit to terminate operation of said motor.

References Cited by the Examiner

UNITED STATES PATENTS

| | | | |
|---|---|---|---|
| 2,947,215 | 8/1960 | Mitchell | 88—24 |
| 3,037,423 | 6/1962 | Shurcliff | 250—204 X |
| 3,249,001 | 5/1966 | Stauffer | 352—140 X |
| 3,249,006 | 5/1966 | Stauffer | 352—140 X |
| 3,249,007 | 5/1966 | Stauffer | 352—140 X |

FOREIGN PATENTS 1,278,250  12/1960  France.

NORTON ANSHER, *Primary Examiner.*